US009560843B1

(12) United States Patent
Cheek

(10) Patent No.: US 9,560,843 B1
(45) Date of Patent: Feb. 7, 2017

(54) REMOTE CONTROL BOAT WITH FISH FINDER

(71) Applicant: Brandon Cheek, Fort Worth, TX (US)

(72) Inventor: Brandon Cheek, Fort Worth, TX (US)

(*) Notice: Subject to any disclaimer, the term of this patent is extended or adjusted under 35 U.S.C. 154(b) by 0 days.

(21) Appl. No.: 14/877,014

(22) Filed: Oct. 7, 2015

(51) Int. Cl.
*B63B 35/00* (2006.01)
*A01K 97/12* (2006.01)

(52) U.S. Cl.
CPC .............. *A01K 97/125* (2013.01); *B63B 35/00* (2013.01); *B63B 2035/008* (2013.01)

(58) Field of Classification Search
CPC .................................................... B63B 35/00
USPC ........................................................ 43/26.1
See application file for complete search history.

(56) References Cited

U.S. PATENT DOCUMENTS

| | | | | | |
|---|---|---|---|---|---|
| 4,104,609 | A * | 8/1978 | Minegishi | ................. | G01S 7/62 367/11 |
| 4,339,888 | A * | 7/1982 | Sheng-Jung | ........... | A01K 91/02 43/26.1 |
| 4,635,391 | A * | 1/1987 | Early | ..................... | A01K 91/02 43/26.1 |
| 4,757,633 | A * | 7/1988 | Van Cleve | ............. | A01K 91/02 43/26.1 |
| 4,809,242 | A * | 2/1989 | Oka | ........................ | G01S 15/96 367/111 |
| 4,829,493 | A * | 5/1989 | Bailey | ..................... | G01S 7/529 181/124 |
| 4,856,222 | A * | 8/1989 | Hannam | ................. | A01K 91/02 43/26.1 |
| 5,154,016 | A * | 10/1992 | Fedora | ................... | A01K 91/02 43/26.1 |
| 5,165,193 | A * | 11/1992 | Dankwardt | ............ | A01K 91/02 43/26.1 |
| 5,201,884 | A * | 4/1993 | Nicholas | ................ | A01K 91/02 43/26.1 |
| 5,293,712 | A * | 3/1994 | Lo | .......................... | A01K 91/02 43/26.1 |
| 5,309,664 | A * | 5/1994 | Wright | ................... | A01K 91/02 43/26.1 |
| 5,363,587 | A * | 11/1994 | Nordling | ............... | A01K 91/02 43/26.1 |
| 5,581,932 | A * | 12/1996 | Bell | ....................... | A01K 91/02 43/26.1 |
| 5,692,064 | A * | 11/1997 | Takagi | .................... | G01S 15/88 377/6 |
| 6,115,681 | A * | 9/2000 | Foreman | ................. | G01S 7/003 370/415 |

(Continued)

FOREIGN PATENT DOCUMENTS

AU WO 2014019019 A1 * 2/2014 ............. A01K 97/00
WO WO 2014019019 A1 2/2014

*Primary Examiner* — Lars A Olson
*Assistant Examiner* — Jovon Hayes
(74) *Attorney, Agent, or Firm* — Kyle A. Fletcher, Esq.

(57) ABSTRACT

The remote control boat with fish finder is designed to give fishermen that are fishing from the bank a way to determine the depth of the water they are fishing, to locate fish within the water they are fishing, and to determine structures and features under the water where fish may be located. The remote control boat with fish finder incorporates a remote controlled boat with an integral fish finder, LED running lights, and an LED spot light. The remote control boat with fish finder comprises a boat, an RC system, a fish finder transponder, a PDA, and a battery.

9 Claims, 7 Drawing Sheets

(56) References Cited

U.S. PATENT DOCUMENTS

| | | | | |
|---|---|---|---|---|
| 6,189,256 B1* | 2/2001 | Boys | .................... | A01K 85/00 |
| | | | | 43/17.2 |
| D456,050 S | 4/2002 | Bao | | |
| 6,520,105 B2* | 2/2003 | Koda | .................... | A01K 91/02 |
| | | | | 114/255 |
| 6,662,742 B2* | 12/2003 | Shelton | ................. | F16M 11/12 |
| | | | | 114/312 |
| 6,690,622 B1* | 2/2004 | Eckberg, Sr. | .......... | A01K 75/00 |
| | | | | 367/165 |
| 6,760,995 B2* | 7/2004 | Mueller | ................ | A01K 91/02 |
| | | | | 43/26.2 |
| D540,889 S | 4/2007 | Yuen | | |
| 7,398,741 B2* | 7/2008 | Koda | .................... | A63H 23/04 |
| | | | | 114/144 RE |
| 8,154,953 B1* | 4/2012 | Sims | .................... | A01K 97/00 |
| | | | | 367/107 |
| 2004/0056779 A1* | 3/2004 | Rast | ..................... | B63B 22/16 |
| | | | | 340/985 |
| 2005/0064774 A1* | 3/2005 | Grune | ................ | B63B 35/7906 |
| | | | | 441/74 |
| 2009/0165356 A1* | 7/2009 | Blum | .................... | A01K 91/02 |
| | | | | 43/26.1 |
| 2013/0107507 A1* | 5/2013 | Tucker | ............... | F21V 23/0435 |
| | | | | 362/190 |

\* cited by examiner

REMOTE CONTROL BOAT WITH FISH FINDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment designed with diverse articles, more specifically, a remote controlled fish finding accessory.

SUMMARY OF INVENTION

The remote control boat with fish finder is designed to give fishermen that are fishing from the bank a way to determine the depth of the water they are fishing, to locate fish within the water they are fishing, and to determine structures and features under the water where fish may be located. The remote control boat with fish finder incorporates a remote controlled boat with an integral fish finder, LED running lights, and an LED spot light.

These together with additional objects, features and advantages of the remote control boat with fish finder will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote control boat with fish finder in detail, it is to be understood that the remote control boat with fish finder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote control boat with fish finder.

It is therefore important that the claims be regarded as including such equivalent construction insofar as they do not depart from the spirit and scope of the remote control boat with fish finder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
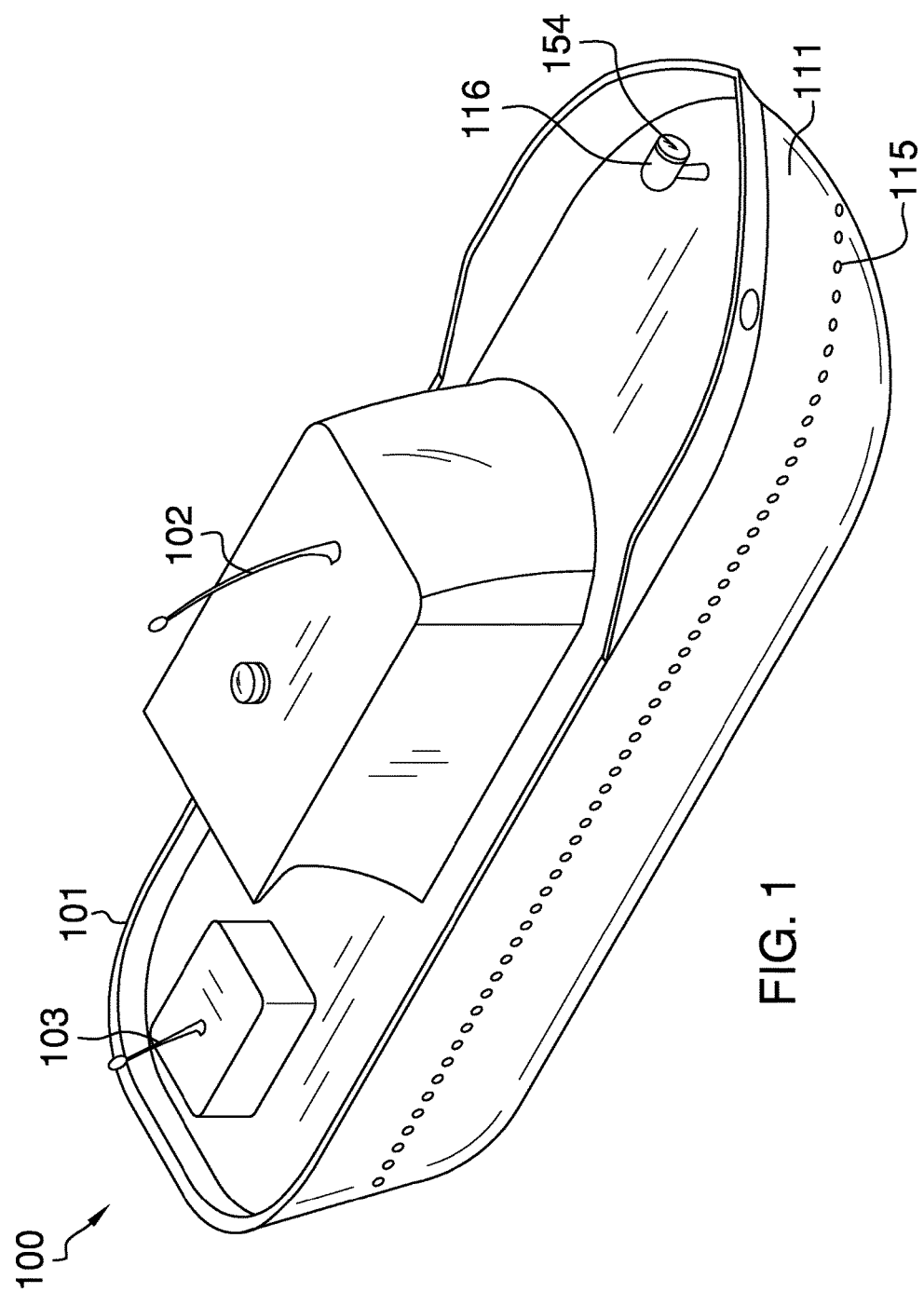
FIG. 1 is a perspective view of an embodiment of the disclosure.
Figure 2:
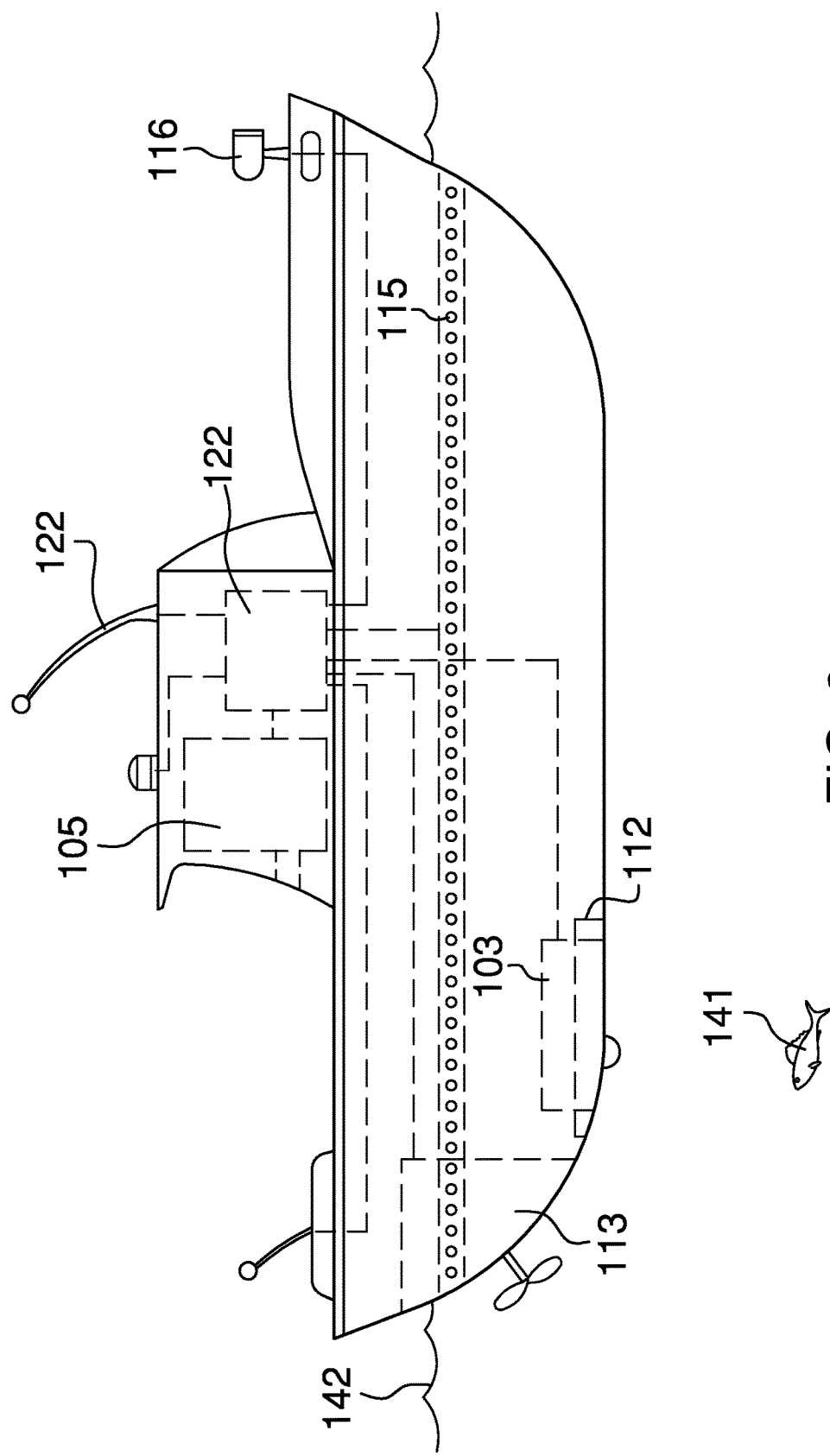
FIG. 2 is a side view of an embodiment of the disclosure.
Figure 3:
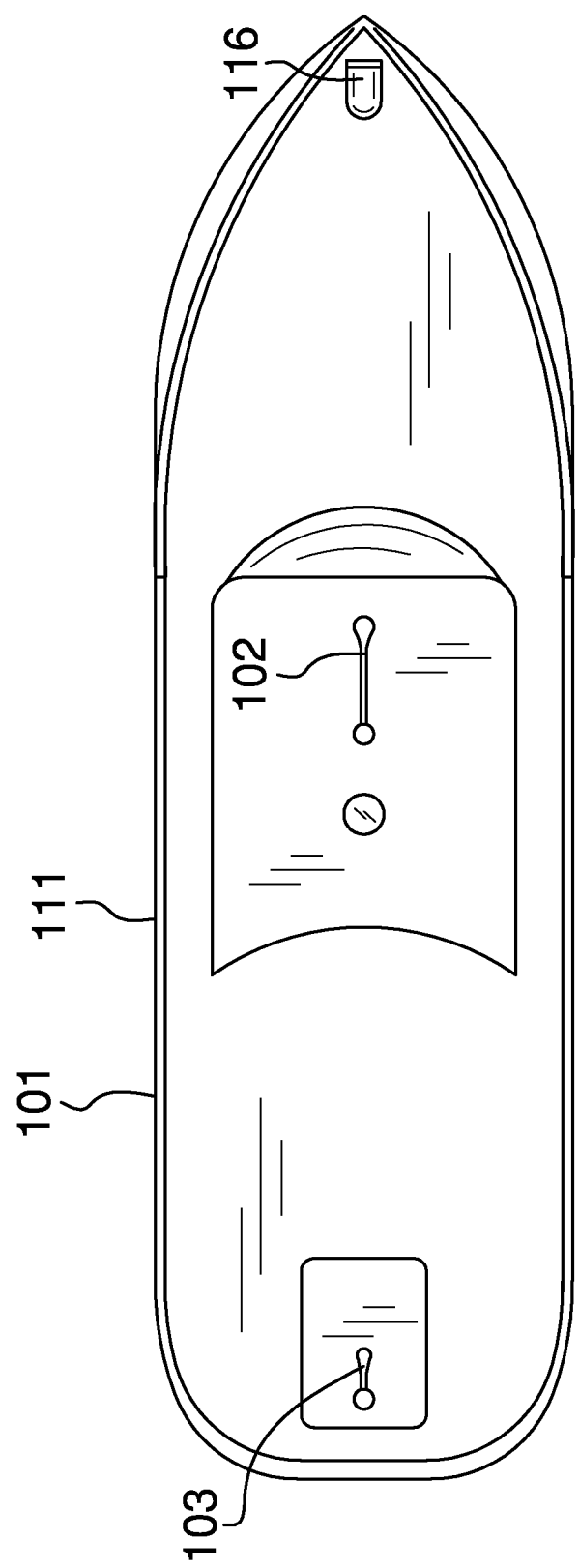
FIG. 3 is a top view of an embodiment of the disclosure.
Figure 4:
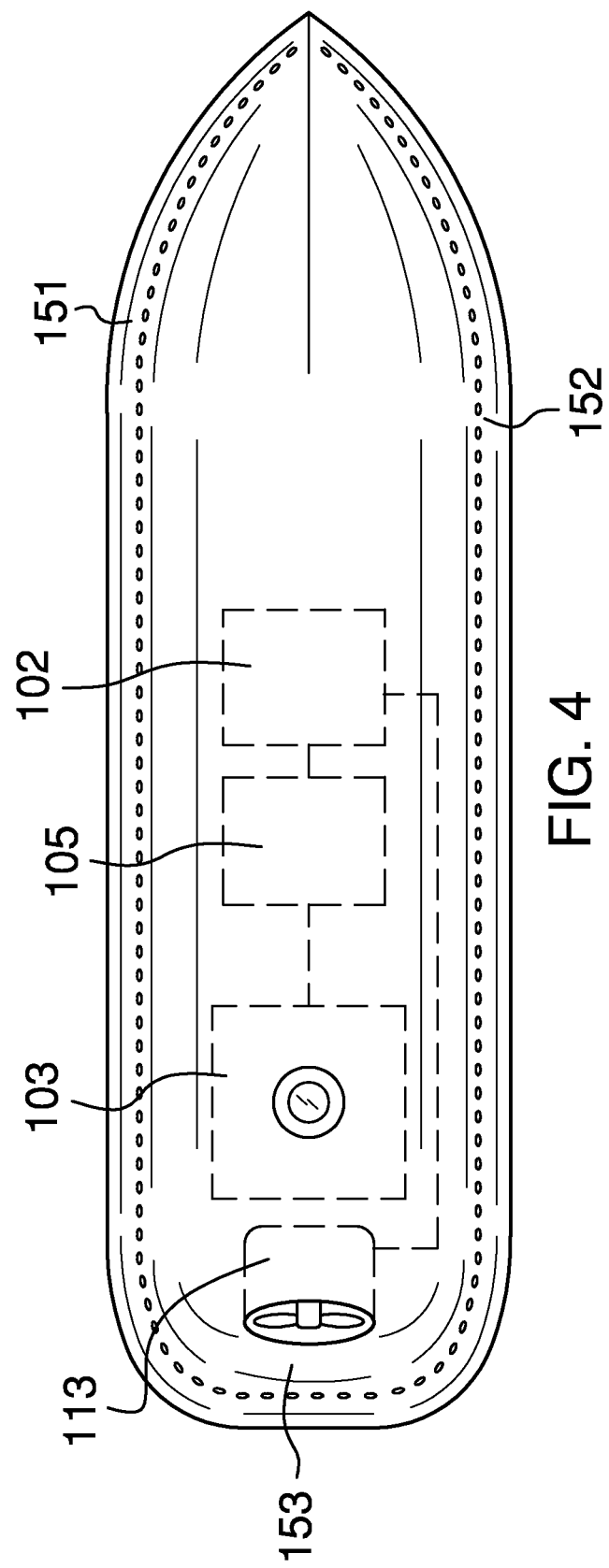
FIG. 4 is a bottom view of an embodiment of the disclosure.
Figure 5:
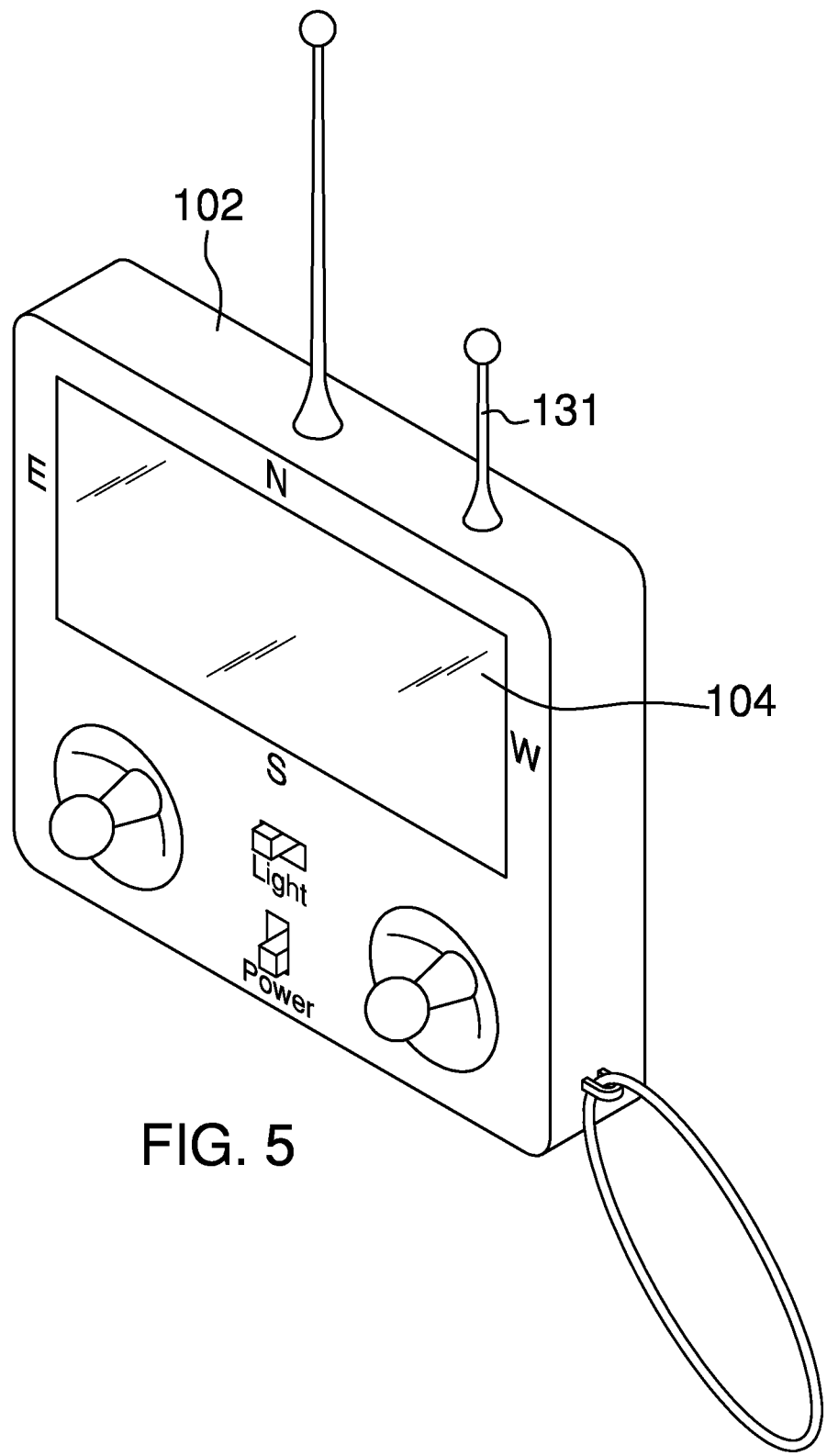
FIG. 5 is a detail view of an embodiment of the disclosure.
Figure 6:
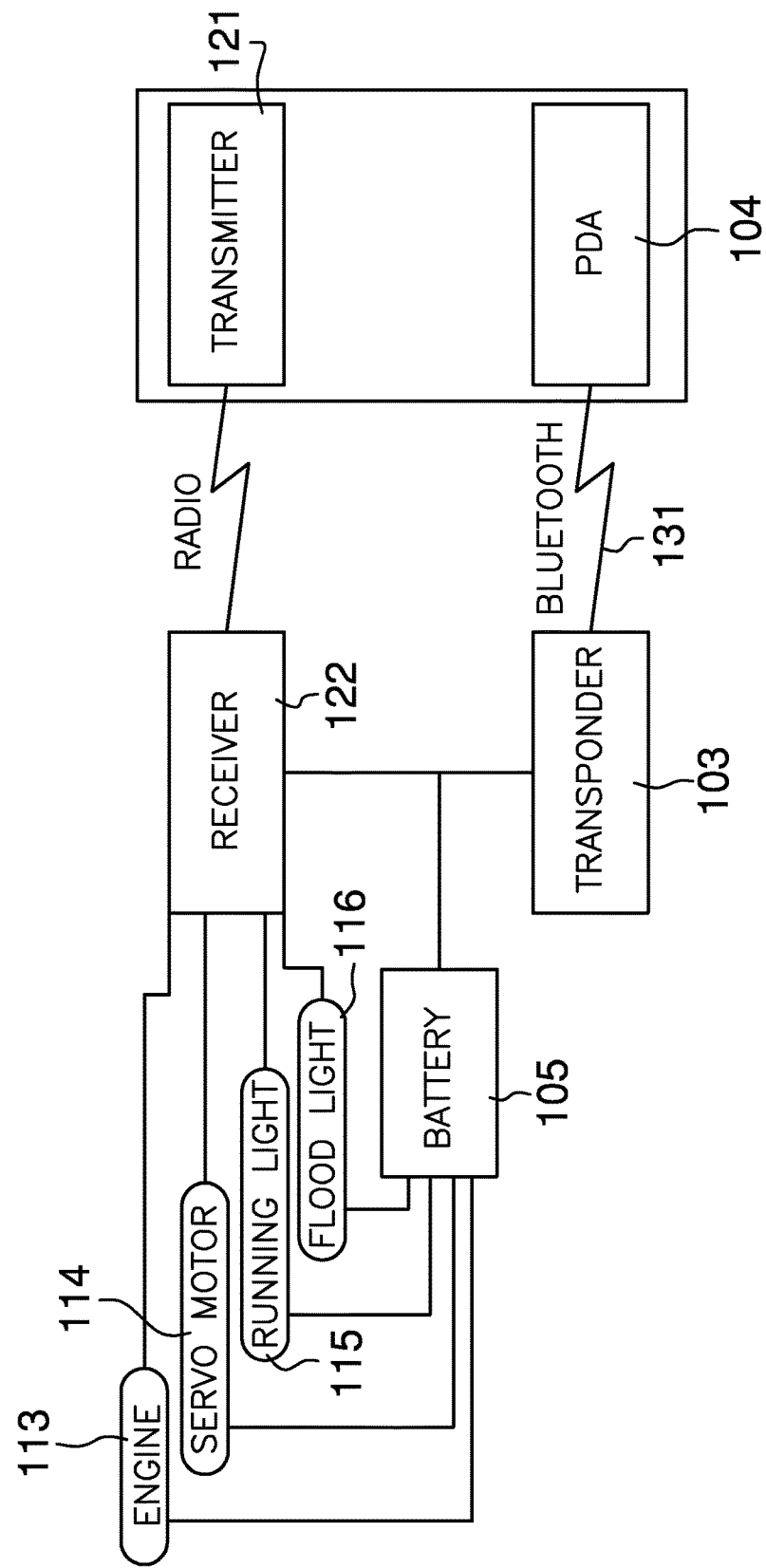
FIG. 6 is a schematic view of an embodiment of the disclosure.
Figure 7:
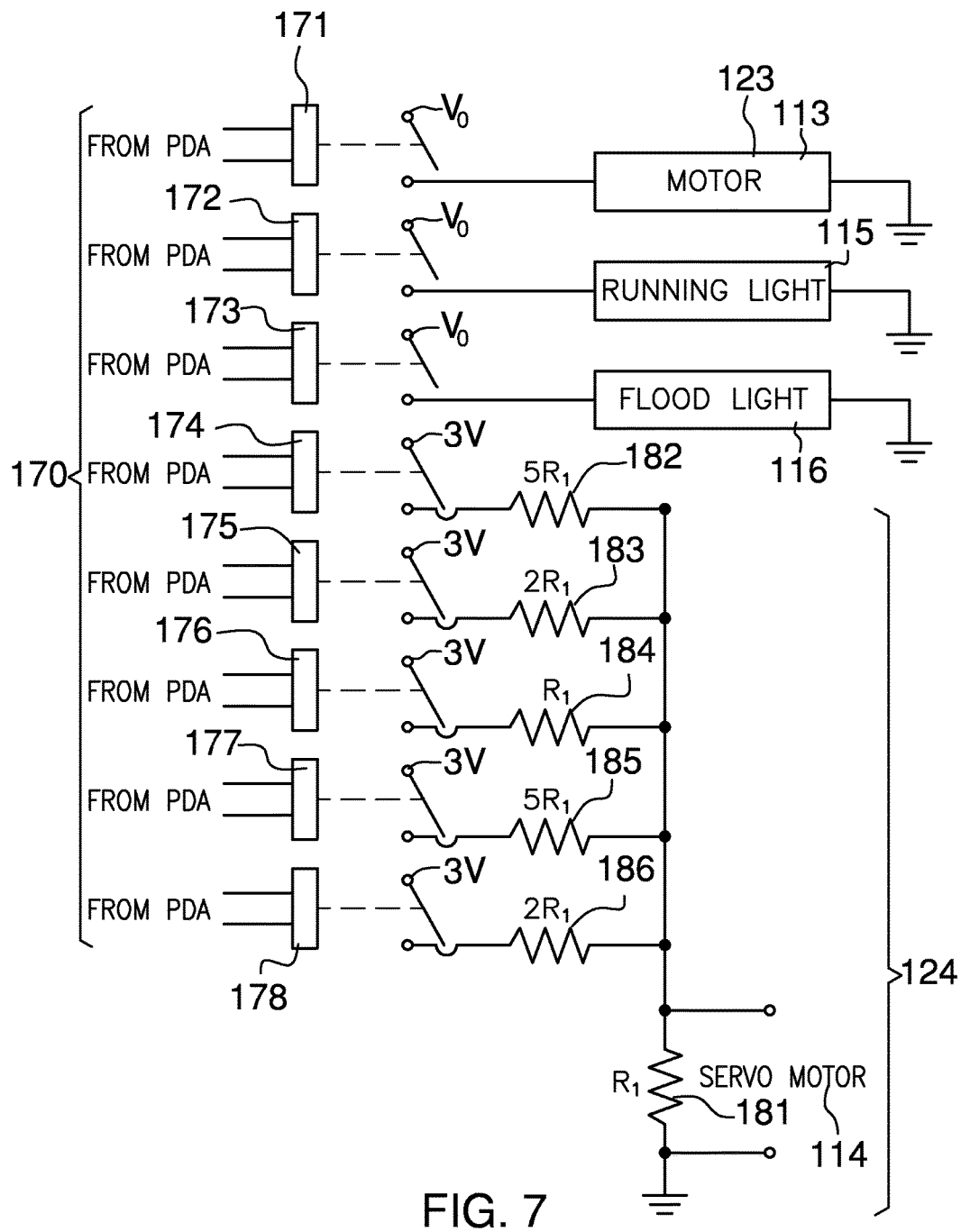
FIG. 7 is a schematic view of an alternate embodiment of the disclosure.

Detailed reference will now be made to a first potential embodiment of the disclosure, which is illustrated in FIGS. 1 through 7.

The remote control boat with fish finder 100 (hereinafter invention) comprises a boat 101, an RC system 102, a fish finder transponder 103, a PDA 104, and a battery 105.

The boat 101 is a small powered vessel that is designed to float and maneuver in water 142. The boat 101 further comprises a hull 111, transponder mount 112, a motor 113, a steering servo 114, running lights 115, and a flood light 116. The hull 111 is the main structure of the boat 101. When the boat 101 is placed in the water 142, the hull 111 is responsible for displacing the volume of water 142 required to allow the boat 101, and by implication the invention 100, to float. The transponder mount 112 is the hardware necessary to securely hold the fish finder transponder 103 in position such that the fish finder transponder 103 is able to search the water 142 underneath the boat 101 for fish 141. The motor 113 is the device that provides the propulsion used to move the boat 101 through the water 142. The steering servo 114 is a servo motor that is used for steering the boat 101. The steering servo 114 can be used to position a rudder or to adjust the position of the motor 113 to the hull 111 in order to change the heading of the boat 101. The running lights 115 are a plurality of LEDs that are placed along the hull 111 of the boat 101 above the water 142 line. The purpose of the running lights 115 is to indicate the position and orientation of the boat 101 for navigational purposes. In order to be suitable for navigational purposes, a green sub-plurality of LEDs 152 are positioned so as to be visible on the starboard side of the boat 101, a red sub-plurality of LEDs 151 are positioned so as to be visible on the port side of the boat 101 and a white sub-plurality of LEDs 153 are positioned so as to be visible from the stern. The flood light 116 comprises one or more LEDs 154 that are is positioned to illuminate the area of the boat 101 in front of the bow to provide visibility during the operation of the boat 101 at night.

The RC system 102 is a remote control system that allows the boat 101 to be operated in that water 142 by land based operator. The RC system 102 further comprises a transmitter 121 and a receiver 122. The purpose of the transmitter 121 is to receive instructions from the operator and to transmit those instructions to the receiver 122. The receiver 122 receives these instructions and uses them to operate the boat 101. A commercially available system can be used for the RC system 102. The RC system 102 is used to control the following functions: 1) a motor control 123 that controls the operation and power output of the motor 113; 2) a steering servo control 124 that changes the position of the steering servo 114 thereby changing the heading of the boat 101; 3) turning on and off the running lights 115, and, 4) turning on and off the flood light 116.

The fish finding function of the invention 100 comprises a fish finder transponder 103 and a PDA 104. A commercially available fish finder transponder 103 with a class 1 Bluetooth connection 131 was used in the first and second embodiments of the disclosure. The class 1 Bluetooth connection 131 is linked with a smartphone or other PDA 104 type device. The operation of the fish finder transponder 103 is controlled by the PDA 104 and the images generated by the fish finder transponder 103 are displayed on the PDA 104.

The operation of the boat 101, receiver 122 and associated control circuits, and the fish finder transponder 103 is powered by the battery 105 which is mounted within the hull 111 of the boat 101.

In the first potential embodiment of the disclosure, the boat 101 is formed from molded plastic and is fitted with a commercially available electric motor and propeller. A commercially available 2.4 GHz radio control transmitter and receiver was used as the transmitter 121 and receiver 122 respectively to control the boat 101. A Bluetooth compatible fish finder (Deeper part number DPOH10S10-P) linked to an android smart phone was used as the fish finder transponder 103 and the PDA 104. A commercially available battery 105 was used for power.

A second, more primitive, potential embodiment of the disclosure is shown in Figure In this embodiment, the boat. 101 and fish finder transponder 103 are identical to the first potential embodiment of the disclosure. In addition, the PDA 104 (an android smart phone) is used to control an eight. channel smart phone relay (Tinysine TS0R-08 170 that is linked via Bluetooth to the PDA 104. The eight channel smart phone relay 170 further comprises a first relay 171, a. second relay 172, a third relay 173, a fourth relay 174, a fifth relay 175, a sixth relay 176, a seventh relay 177 and an eighth relay 178. The PDA 104 can indeenden control each relay. The first relay 171 is used to supply power to the motor 113. The second relay 172 is used to turn on and off the running lights 115. The third relay 173 is used to turn on and off th flood light 116. The sixth relay 176 is used to trim the steering servo 114 so that the boat 101 remains on its current course The fifth relay 175 and the seventh relay 177 are used to trim the steering servo 114 such that the boat 101 turns 30 degrees port or starboard respectively. The fourth. relay 174 and the eighth relay 178 are used to trim the steering servo 114 such that the boat 101 turns 60 degrees port or starboard respectively.

The steering servo 114 is controlled. using a first resistor 181, a second resistor 182, a third resistor 183, a fourth resistor 184, a fifth resistor 185, and a sixth resistor 186. The second resistor 182 is wired to the fourth relay 174 and is sized to be 5 times the size of thefirst resistor 181. The third resistor 183 is wired to the fifth relay 175 and is sized to be 2 times the size of the first resistor 181. The fourth resistor 184 is wired. to the sixth relay 176 and is sized. to be the same size of the first resistor 181. The fifth resistor 185 is wired to the seventh relay 177 and is sized to be half the size of the first resistor 181. The sixth resistor 186 is wired to the eighth relay 178 and is sized to be 20 percent of the size of the first resistor 181. The wiring of the a second resistor 182, the third resistor 183, the fourth resistor 184, the fifth resistor 185, and the sixth resistor 186 is such that when the appropriate relay is closed, a voltage divider is formed that generates a control voltage across the first resistor 181 that is used to control the steering servo 114. A commercially available servo motor with a 180 degree range was used.

The following definitions were used in this disclosure:
Battery: As used in this disclosure, a battery is a container consisting of one or more cells, in which chemical energy is converted into electricity and used as a source of power.
Fish Finder: As used in this disclosure, a fish finder is a device that is used to find the location of fish under the water. Most fish finders locate fish by detecting the reflection of sonic pluses off the fish.
Heading: As used in this disclosure, the heading is the direction of motion of an object.
PDA: As used in this disclosure, a PDA is a handheld device that is used for managing personal information and communication. Examples of PDAs include, but are not limited to, cellular phones, tablets and smart phones.
RC As used in this disclosure, RC is an acronym for remote control.
Remote Control: As used in this disclosure, remote control means the establishment of the control of a device remotely generally through radioed instructions or coded signals.
Transponder: As used in this disclosure, a transponder is a device that is designed to receive a signal and, in response to receiving the signal, transmits a different signal, often a radio signal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A fish finding device comprising:
a boat, an RC system, a fish finder transponder, and a PDA;
wherein the fish finding device is controlled remotely;

wherein the boat is integrated with the fish finder transponder;

wherein the boat further comprises LED based navigational lights;

wherein the boat further comprises an LED based flood light;

wherein the boat further comprises a hull, transponder mount, a motor, a steering servo, running lights, and a flood light;

wherein the transponder mount is used to mount the fish finder transponder;

wherein the motor is an electrical device that provides propulsion;

wherein the steering servo is a servo motor that is used for steering the boat;

wherein the running lights are a plurality of LEDs that are placed along the hull of the boat;

wherein the flood light comprises one or more LEDs;

wherein the RC system further comprises a transmitter and a receiver;

wherein the RC system comprises a first electrical circuit to control the operation and power output of the motor;

wherein the RC system further comprises a second electrical circuit to change the position of the steering servo;

wherein the RC system further comprises a third electrical circuit to turn on and off the running lights;

wherein the RC system further comprises a fourth electrical circuit to turn on and off the flood light.

2. The fish finding device according to claim 1 wherein the fish finder transponder further comprises with a Bluetooth connection.

3. The fish finding device according to claim 2 wherein the Bluetooth connection is linked to a PDA device.

4. The fish finding device according to claim 3 wherein the operation of the fish finder transponder is controlled by the PDA;

wherein the images generated by the fish finder transponder are displayed on the PDA.

5. The fish finding device according to claim 4 wherein the first electrical circuit comprises a first remotely controlled relay.

6. The fish finding device according to claim 5 wherein the third electrical circuit comprises a second remotely controlled relay.

7. The fish finding device according to claim 6 wherein the fourth electrical circuit comprises a third remotely controlled relay.

8. The fish finding device according to claim 7 wherein the second electrical circuit comprise a fourth remotely controlled relay, a fifth remotely controlled relay, a sixth remotely controlled relay, a seventh remotely controlled relay, and an eighth remotely controlled relay.

9. The fish finding device according to claim 7 wherein the second electrical circuit further comprises a first resistor, a second resistor, a third resistor, a fourth resistor, a fifth resistor, and a sixth resistor.

* * * * *